UNITED STATES PATENT OFFICE.

OTTO KLETTE, OF BRESLAU, GERMANY.

COMPOSITION FOR PAPER STUCCO.

SPECIFICATION forming part of Letters Patent No. 439,526, dated October 28, 1890.

Application filed January 6, 1890. Serial No. 336,045. (No specimens.)

*To all whom it may concern:*

Be it known that I, OTTO KLETTE, a subject of the King of Prussia, residing at Breslau, in the Kingdom of Prussia, German Empire, have invented certain new and useful Improvements in Composition for Paper Stucco, of which the following is a full, clear, and exact description.

The object of my improvements is the production of stucco from a peculiar paper mass prepared from vegetable fiber, which is advantageously distinguished from the the very fragile and heavy plaster stucco by its sharp and deep impressions, lightness, firmness, and cheapness. The process is carried out by heated dies or molds with heavy stamping process.

The raw material employed herein consists of vegetable-pulp board composed of vegetable fiber, which especially has the property of being in a high degree flexible and pliable and very tough. This vegetable-pulp board is prepared in such a manner by impregnating the same with a mixture of liquid glue, plaster or whiting, a quantity of siccative, and sulphuric acid, which mixture penetrates the said raw material, so that it attains a hardness equal to metal after it has been stamped into the sharpest possible outlines. The thus produced stamped pieces are subjected to a finishing process for further ornamentation, which may be carried out in various manners and by various means. The simplest style of this finishing process consists in coating the stamped pieces as they are taken out of the dies or have left the stamping-press with a mixture of glue and whiting and thereupon drying them, whereby they assume an appearance of earthenware. The pieces may thereupon be decorated by painting them in oil or water color, which is so much more effective, as the stucco made from vegetable-pulp board far excels the plaster stucco in sculpture. Instead of this process the stamped pieces may be covered with satin or silk, which exhibits a high degree of elegance, when they are decorated by painting where such decoration is practical. In this case the finished stamped piece is covered with a coating of dissolved gelatine, which thereupon is dried. The satin is thereupon exposed to steam to make it more pliable and is placed upon the stamped piece, and secured to the same by pressure under heat. The stamped pieces may further be covered with tin-foil in the same manner. The tin-foil conforms so closely to the shape of the piece that all lines appear extremely fine. The pieces thus prepared may be wiped with a wet cloth.

By the use of vegetable-pulp board prepared from vegetable fiber, in connection with the impregnating mass for the production of this kind of stamped pieces, stucco, &c., an excellent product is attained, which will neither crack nor blister, and which on account of its inherent elasticity excels the most excellent works of sculpture.

For the purpose of rendering this product more resisting to moisture when used as stucco—for example, in new buildings—although it is not influenced by any moisture on account of its former impregnation, a quantity of linseed-oil is added to this mixture, whereby it becomes entirely unassailable by moisture. By impregnating vegetable-pulp board, which is especially adapted to this kind of stamping, impressions may be made to the depth of one hundred and fifty millimeters, and the objects excel all other heretofore-known imitations of stucco by their solidity, equal to metal, resistance to atmospheric influences, and especially by their lightness, as well as by the fact that they do not blister.

I claim—

1. The herein-described paper stucco, formed of vegetable pulp impregnated with glue, plaster or whiting, siccative, sulphuric acid, and linseed-oil, for the purpose set forth.

2. The herein-described paper stucco, formed of vegetable pulp, a suitable binding material, and a covering of silk, for the purpose set forth.

3. The herein-described paper stucco, formed of vegetable pulp impregnated with a suitable hardening material, a coating of gelatine, and an outside covering of silk, as herein set forth.

In witness whereof I have hereunto set my hand in presence of two witnesses.

OTTO KLETTE.

Witnesses:
BRUNO REINHOLTZ,
MARGOT HENNEK.